US007008577B2

(12) United States Patent
Dehennau et al.

(10) Patent No.: US 7,008,577 B2
(45) Date of Patent: Mar. 7, 2006

(54) EXTRUSION HEAD FOR EXPANDED PLASTIC TUBES

(75) Inventors: Claude Dehennau, Waterloo (BE); Martine Kaszacs, Braine L'Alleud (BE)

(73) Assignee: Solvay (Societe Anonyme), Brussels (BE)

( * ) Notice: Subject to any disclaimer, the term of this patent is extended or adjusted under 35 U.S.C. 154(b) by 386 days.

(21) Appl. No.: 10/312,038

(22) PCT Filed: Jun. 19, 2001

(86) PCT No.: PCT/EP01/06950

§ 371 (c)(1),
(2), (4) Date: Dec. 23, 2002

(87) PCT Pub. No.: WO01/98057

PCT Pub. Date: Dec. 27, 2001

(65) Prior Publication Data

US 2003/0164569 A1 Sep. 4, 2003

(30) Foreign Application Priority Data

Jun. 22, 2000 (FR) .................................. 00 08111

(51) Int. Cl.
*B29C 44/20* (2006.01)
*B29C 44/46* (2006.01)

(52) U.S. Cl. ....................... 264/45.9; 264/51; 425/4 C; 425/131.1; 425/461; 425/462; 425/817 C

(58) Field of Classification Search ................ 425/4 C, 425/817 C, 461, 462, 131.1; 264/45.9, 51
See application file for complete search history.

(56) References Cited

U.S. PATENT DOCUMENTS

| | | | | | |
|---|---|---|---|---|---|
| 3,936,518 | A | * | 2/1976 | Soda et al. | 264/45.5 |
| 4,017,245 | A | * | 4/1977 | Lang | 425/327 |
| 4,221,621 | A | * | 9/1980 | Seki et al. | 156/78 |
| 4,222,729 | A | * | 9/1980 | Ragazzini et al. | 425/378.1 |
| 4,484,883 | A | | 11/1984 | Honda et al. | |
| 4,518,557 | A | * | 5/1985 | Wecker | 264/45.9 |
| 4,657,497 | A | * | 4/1987 | Dehennau et al. | 425/133.1 |
| 5,069,612 | A | | 12/1991 | Teutsch et al. | |
| 6,583,193 | B1 | * | 6/2003 | Park et al. | 521/142 |

FOREIGN PATENT DOCUMENTS

| | | |
|---|---|---|
| DE | 41 35 336 | 4/1993 |
| EP | 0 435 786 | 7/1991 |
| JP | 60 259175 | 12/1985 |
| JP | 7 009556 | 1/1995 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

An extrusion head for the manufacture of tubes including at least one layer of expanded plastic by extruding a stream of molten plastic containing a blowing agent through an annular passage cross section made in the extrusion head. The stream of molten plastic containing the blowing agent spreads out circumferentially and welds itself to itself by the recombining of the two stream fronts. The extrusion head is equipped with a special-purpose thermal regulation device allowing the molten plastic containing the blowing agent to be heated or cooled after the stream fronts have recombined.

20 Claims, 1 Drawing Sheet

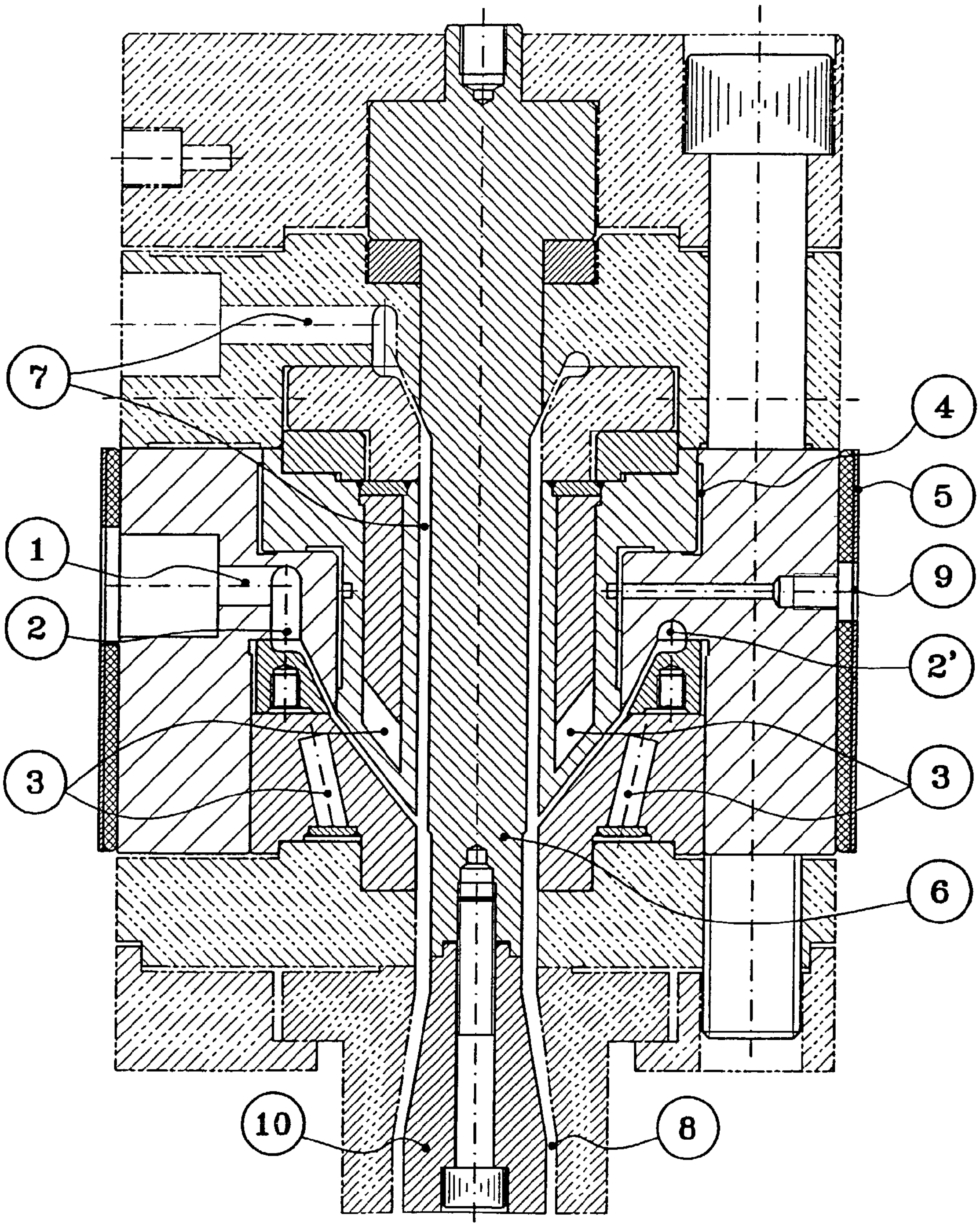
7
4
5
1
9
2
2'
3
3
6
10
8

EXTRUSION HEAD FOR EXPANDED PLASTIC TUBES

The present invention relates to an extrusion head for the manufacture of tubes comprising at least one layer of expanded plastic. The present invention also relates to a method of manufacturing such tubes.

Tubes (and cylindrical objects in general) having at least one layer of expanded plastic have the advantage, over tubes made of unexpanded plastic, of being lighter in weight and therefore more economical. Furthermore, the layer of expanded plastic may act as thermal and/or acoustic insulation, as a protective coating, etc. Numerous attempts have been made in the past at optimizing the degree of expansion of the plastic and the mechanical properties of the tubes obtained, particularly by adapting the (co)extrusion extrusion head. Most of these extrusion heads are equipped with a single heating device, possibly common to all the layers in the case of coextrusion heads, and this makes optimizing them somewhat difficult in spite of everything.

U.S. Pat. No. 4,484,883 and U.S. Pat. No. 5,069,612 describe coextrusion heads which are not specific to expanded plastics but which can be used for such materials, and which have the advantage of independent temperature regulation for each layer that is to be extruded. However, within one and the same layer, the temperature is homogeneous because there is just one thermal regulation device per layer. Such extrusion heads are suited to non-linear plastics (LDPE) and/or plastics which are non-crystalline or not very crystalline (PS, PVC, PCL) or, more generally, to plastics which have a sufficiently broad expansion temperature range. By contrast, in the case of linear and semicrystalline plastics such as HDPE or PP, the molecular disentanglement which occurs upon expansion is likely to lead to tearing of the stream of material if the material temperature is too high. Furthermore, such extrusion heads are difficult to optimize because, in order to avoid the plastic expanding within them, and uncontrolled expansion upon leaving the die, they must not be heated excessively, whereas if they are not heated sufficiently, the viscosity of the plastic is too high and there is a risk that the plastic will set at the die.

In consequence, the subject of the present invention is an extrusion head for the manufacture of tubes comprising at least one layer of expanded plastic which is easy to optimize and to regulate and makes it possible to obtain tubes which have good mechanical properties and good regularity of cell morphology at the surface and within, regardless of the type of plastic anticipated. Another subject of the present invention is a method of manufacturing expanded plastic tubes using such an extrusion head and a method of manufacturing sheets from such tubes by cutting along one of their generatrices.

The present invention therefore relates to an extrusion head for the manufacture of tubes comprising at least one layer of expanded plastic by extruding a stream of molten plastic containing a blowing agent through an annular passage cross section made in the extrusion head and in which the stream of molten plastic containing the blowing agent spreads out circumferentially and welds itself to itself by the recombining of the two stream fronts, the said extrusion head being equipped with a special-purpose thermal regulation device allowing the molten plastic containing the blowing agent to be heated or cooled after the stream fronts have recombined.

A tube is to be understood as meaning any cylindrical object such as a pipe; a parison of a bottle; a tubular envelope which, when cut, will yield a sheet; a cable sheath, etc.

An extrusion head according to the present invention is to be understood as meaning a collection of metal blocks and a core comprising a passageway for at least one stream of molten plastic leaving an extruder. Such a collection generally comprises at least one block for spreading the material in the form of an annular stream (or distributor) and, in the case of a coextrusion head, it generally comprises at least one distributor per layer of material. The extrusion head according to the present invention is generally followed by an outlet block known as a die. The distributor and the die, as appropriate, have passing right through them a cylindrical orifice which, with the core, determines an annular passage cross section for the molten plastic. The stream of molten plastic, which is supplied to the extrusion head according to the present invention via a suitable opening, is generally a solid cylindrical stream of plastic under pressure. In the case of a coextrusion head, there are generally as many feed orifices as there are streams of cylindrical material.

The plastic according to the present invention is preferably an extrudable plastic or a thermoplastic. This resin may be of any kind, crystalline or amorphous. It may be a so-called utility plastic such as a polyolefin (PE, PP) or PVC. It may just as easily be a so-called specialist plastic, such as a fluorinated resin and, in particular, PVDF; polycaprolactone (PCL) etc. It is preferably a semicrystalline plastic such as PP, HDPE (modified (for example using a silane) or unmodified), PVDF or PCL. These resins may include fillers (fibrous, particulate, etc.) and various customary additives such as plasticizers, fire retardants, stabilizers, etc.

The blowing agent according to the present invention may be of any known type. It may be a "physical" blowing agent, that is to say a gas dissolved in the plastic under pressure and which causes it to expand as the pressure relaxes on leaving the extruder. Examples of such gases are $CO_2$, nitrogen, water vapour, HFCs (such as SOLKANE® XG87), hydrocarbons (such as butane and pentane) or a mixture of the above. It may also be a "chemical" blowing agent, that is to say a substance (or a mixture of substances) dissolved or dispersed in the plastic and which, under the effect of temperature, releases the gas or gases which will serve to expand the plastic. Examples of such substances are azodicarbonamide, a mixture of sodium bicarbonate and citric acid, etc.

The annular passage cross section made in the extrusion head according to the present invention is preferably preceded by an equalizing device which lies after the feed opening of the extrusion head. This device may be of any known type. However, it is generally a toric groove which acts as a reservoir to form a constant and uniform stream of material at the annular passage cross section and which therefore has a larger cross section than this annular passage. This toric groove generally has a non-constant cross section which decreases from the material inlet towards the point at which the stream fronts recombine, so as to even out the velocity profile of the material after recombination. In this case, the recombination of the stream fronts takes place in the groove and therefore, according to the invention, the stream of material is not cooled until after it has passed through this groove.

The device for the thermal regulation of the extrusion head according to the present invention is of any known type. It is a device allowing the plastic to be cooled or heated. This device generally combines an external heating device such as a heating collar (resistive electric element or double wall with heat transfer fluid) closely surrounding the extrusion head, and an internal heating device. Such a device advantageously uses a heat transfer fluid which may for example be oil. In consequence, the extrusion head according to the present invention preferably comprises at least one duct for the internal circulation of such a fluid. Advantageously, it will comprise two ducts to allow the two sides of the layer that is to be expanded to be cooled.

The special-purpose thermal regulation device preferably ensures a temperature close to the melting point of the plastic to be expanded ($T_f$) within the molten plastic containing the blowing agent. This temperature is advantageously at most $T_f$+30° C. or even at most $T_f$+10° C. This temperature is not generally lower than $T_f$, and is preferably not lower than $T_f$+5° C.

The plastic is preferably expanded after leaving the die which is arranged just after the extrusion head according to the present invention. For this purpose, the annular passage cross section of the extrusion head according to the present invention is advantageously narrowed just before the opening via which the molten plastic containing the blowing agent leaves the extrusion head. This narrowing makes it possible to create enough back-pressure and to avoid pre-expansion actually within the die. Alternatively, this narrowing of cross section may take place in the die which follows the extrusion head. This narrowing is preferably achieved by adjusting the thickness of the core.

The extrusion head according to the present invention consists of one or more materials of suitable mechanical strength and thermal resistance. It is generally at least partly made of metals which may be pure or in the form of alloys. Mention may be made, by way of example, of stainless steels heat-treated to increase their hardness. The extrusion head according to the present invention may also include elements with a low thermal resistance such as Cu—Be alloys (to improve the heat exchange between the heat transfer fluid and the plastic that is to be expanded). The extrusion head according to the present invention may also include ceramics or air pockets as insulating elements.

According to a preferred alternative form of embodiment, the extrusion head according to the present invention is such that all the surfaces which come into contact with the material that is to be expanded encourage this material to slip and prevent ruptures in the flow. A slippery coating, for example of Teflon® resin, on these surfaces is suitable for this purpose.

The extrusion head according to the present invention may be used for extruding monolayer tubes of expanded plastic. Advantageously, this extrusion head will be used for coextrusion and will allow at least one other layer of expanded or unexpanded plastic to be applied on the inside and/or on the outside of the layer of expanded plastic. These layers may be aimed at increasing the mechanical strength and/or chemical resistance, the surface appearance, the roughness, the thermal or acoustic insulation, etc. The plastic of which these layers are made may be identical to the expanded plastic but is generally different. It may be a recycled plastic. These layers may also contain filler substances and/or various customary additives as described above in the case of the layer of expanded plastic. The extrusion head according to the present invention is therefore particularly suitable for manufacturing multilayer tubes comprising at least one layer of expanded plastic and at least one layer of unexpanded plastic. As a preference, the layer of unexpanded plastic is also heated or cooled by a special-purpose thermal regulation device. A coextrusion head consisting of blocks independently temperature-regulated by special-purpose devices is particularly advantageous. These blocks are preferably insulated from each other by appropriate means. For this purpose they may be separated by empty spaces. As a preference, these blocks are designed so that they allow the layer or layers adjacent to the layer of expanded plastic to be cooled (this being so as to avoid losing the benefit of cooling the latter layer). The device for cooling the layer of expanded plastic is advantageously arranged in such a way that it also cools the adjacent layers. This approach makes it possible to avoid the expanded layer heating back up upon contact with the other layers and therefore at least partly losing the benefit of having cooled it.

When the tube comprises an external layer of unexpanded plastic, this layer is advantageously not cooled excessively in the extrusion head. What happens is that excessive cooling could have the result of causing this layer to set too much and in doing so of inhibiting the expansion of the internal layer. The external layer of unexpanded plastic will preferably be applied to the multilayer structure just before it leaves the extrusion head. Its viscosity will be tailored so as to allow optimum expansion of the layer of expanded plastic.

BRIEF DESCRIPTION OF THE FIGURE

The extrusion head of the present invention is illustrated nonlimitingly by FIG. 1.

DETALED DESCRIPTION OF THE PREFERRED EMBODIMENT

This FIGURE depicts a longitudinal section (parallel to the axis) in a coextrusion extrusion head designed to extrude a two-layer tube with an internal layer of unexpanded plastic and an external layer of expanded plastic. The cylindrical stream of plastic which contains the blowing agent (1) and which leaves the extruder (not depicted) opens into a toric groove (2) where it is spread out circumferentially to recombine its two fronts at the point (2'). The cross section of the groove is smaller at the point (2') than at the point (2) so as to even out the velocity front of the material leaving the groove right along the circumference (following the pressure drop observed throughout the length of the journey of the material along the groove). The extrusion head has cavities (3) intended to contain the oil for cooling the material for expansion after the stream fronts have recombined, and for cooling the layer of unexpanded plastic (7) on the side at which it welds itself to the layer that is to be expanded. This approach makes it possible to prevent the excessively hot layer of unexpanded material from interfering with the cooling of the layer that is to be expanded. Empty spaces (4) are provided to insulate the blocks heated by heating collars (5) from the oil-cooled blocks. The diameter of the annular orifice which extends from the groove decreases as the plastic flows from the groove towards the core (6) and joins the stream of unexpanded plastic (7) which forms the internal layer of the tube. The cross section of the annular orifice narrows and is at a minimum at the point (8) and as far as the exit from the die (10) so as to ensure a back-pressure that prevents the external layer from expanding in the die. The internal temperature of the coextrusion head at the location of the cooling is monitored by a thermocouple (9).

The tubes obtained by the method according to the present invention find an application in various fields such as the carriage of waste water. In this case, these are, for example, tubes with an internal layer made of unexpanded PE and an external layer of expanded PE which gives the tube the strength to withstand the stones in the ground in which these tubes are buried. They may also be PE tubes intended to convey hot water for heating in particular and which are thermally insulated by an external layer of expanded PE.

As explained earlier, a tube is to be understood as meaning any hollow cylindrical object. Thus, it may be the sheath of an electric cable, for example based on expanded PVDF. It may also be sheets obtained by cutting these cylinders along one of their generatrices and which find an application in decoration, in the automotive industry, in building, etc.

One advantageous application of the present invention consists of acoustic insulation in the automotive industry.

The present invention is also illustrated nonlimitingly by Examples 1 to 3 set out hereinafter. In each of these examples, two two-layer tubes with inside diameters of 32 mm and outside diameters of 40 mm were extruded under identical conditions. These tubes comprise:

1. An internal layer 1 mm thick based on unexpanded resin for tubes: the resin ELTEX® TU B 125, an HDPE from SOLVAY, with an MI 2.16 (Melt Index under a load of 2.16 kg according to ISO 1133) of below 0.15 g/10 min, an MI 5 equal to 0.48 g/10 min, an average molecular mass distribution width and a density of 952 kg/m$^3$.
2. An external layer 3 mm thick based on expanded resin which is:
   for one tube, the resin HE 1102 by BOREALIS, an HDPE resin developed for extrusion-foaming application and already containing a nucleating agent, which has an MI 2.16 of 5 g/10 min and a density of 950 kg/m$^3$
   for the other tube, the resin ELTEX® A4040 by SOLVAY, an HDPE resin not intended for expansion and having an MI 2.16 of 4 g/10 min and a density of 944 kg/M$^3$.

The extruded tubes were cooled in the open air and the foam can therefore expand freely in each case.

COMPARATIVE EXAMPLE 1

The tubes were extruded using a conventional die fitted with a single thermal regulation device set at 180 °C.

The difference in density between the resin for expansion and the standard resin is relatively high: 30%. The type of temperature regulation is not suited to the standard resin which has the appearance of an excessively expanded resin with irregular cells.

COMPARATIVE EXAMPLE 2

The operating technique used was identical to the one described in Comparative Example 1 but the overall temperature setting this time was 140° C.

The appearance of the foam cells was more regular but the surface of the tube was more irregular and had ruptures in the flow because the material had cooled excessively at the surface. In addition, the stream weld line formed after the material to expand had entered the coextrusion head was more visible than in the first case.

EXAMPLE 3 (ACCORDING TO THE INVENTION)

A coextrusion head such as the one depicted in the FIGURE was used, with the temperature of the heating collars set at 180° C. to avoid rupture in the flow and poor welding of the stream lines; and the temperature of the oil circuits was set at 140° C. so as to cool the material for expansion to the optimum expansion temperature.

The distribution of the cells was uniform. There was no rupture of the flow at the surface nor visible stream weld lines.

By virtue of optimization of the expansion temperature, the foam obtained from the standard HDPE was of a quality comparable with that obtained from the resin developed for foaming. In addition, the difference in density between the two resins was reduced from 30 to 16%, something which is advantageous from an economics point of view because, although the density of the foam of standard resin is still higher than that of the resin for foaming, the difference between the two is small enough that the material cost of the foam is in favour of the standard resin.

What is claimed is:

1. Extrusion head for manufacture of tubes comprising at least one layer of expanded plastic by extruding a stream of molten plastic containing a blowing agent through an annular passage cross section made in the extrusion head and in which the stream of molten plastic containing the blowing agent spreads out circumferentially and welds itself to itself by recombining of two stream fronts, wherein the extrusion head is equipped with a special-purpose thermal regulation device allowing the molten plastic containing the blowing agent to be heated or cooled after the two stream fronts have recombined, wherein the annular passage cross section is preceded by an equalizing device which lies after a feed opening of the extrusion head and which is in a form of a toric groove, and the special-purpose thermal regulation device is configured to not cool the stream of molten plastic until after the stream of molten plastic has passed through the toric groove.

2. Extrusion head according to claim 1, further comprising at least one duct for internal circulation of a heat transfer fluid.

3. Extrusion head according to claim 1, wherein the special-purpose regulation device is configured to ensure a temperature of between $T_f$+30 C and $T_f$ within the molten plastic containing the blowing agent, $T_f$ being a melting point of the plastic.

4. Extrusion head according to claim 1, wherein the annular passage cross section has a narrowing just before the at least one duct by which the molten plastic containing the blowing agent leaves the extrusion head.

5. Extrusion head according to claim 1, wherein all the surfaces of the extrusion head that come into contact with the material that is to be expanded have a coating made of Teflon® resin.

6. Extrusion head according to claim 1, further comprising a passageway for at least one layer of unexpanded plastic on an inside and/or on an outside of the at least one layer of expanded plastic.

7. Extrusion head according to claim 6, wherein the at least one layer of unexpanded plastic is also heated or cooled by the special-purpose thermal regulation device.

8. Method of manufacturing tubes comprising at least one layer of expanded plastic, using an extrusion head according to claim 1.

9. Method according to claim 8, wherein the plastic is PP, HDPE, PVC, PCL or PVDF.

10. Method according to claim 9, wherein the special-purpose thermal regulation device is used to cool the molten plastic containing the blowing agent.

11. An extrusion head for manufacturing tubes comprising:

a first annular passage configured to receive a first stream of molten material;

a groove configured to receive a second stream of molten material at an inlet, to split the second stream of molten material and to recombine said split second stream of molten material at a recombination portion of said groove, wherein a cross-section of said groove is greater at said inlet than at said recombination portion;

a second annular passage configured to receive said second stream of molten material from said groove, wherein said first and second annular passages meet each other at a joining portion; and a thennal regulation device configured to regulate a temperature of said second stream of molten material without cooling said second stream of molten material until after said second stream of molten material has passed through said groove.

12. The extrusion head according to claim 11, wherein said cross-section of said groove is larger than a cross-section of said second annular passage.

13. The extrusion head according to claim 11, wherein said groove is a toric groove.

14. The extrusion head according to claim 11, further comprising said second stream of molten material.

15. The extrusion head according to claim 14, wherein said second stream of molten material comprises molten plastic with a blowing agent.

16. The extrusion head according to claim 11, further comprising said first and second streams of molten material.

17. The extrusion head according to claim 16, wherein said second stream of molten material comprises molten plastic with a blowing agent and said first stream of molten material comprises molten plastic free of said blowing agent.

18. The extrusion head according to claim 11, wherein said thermal regulation device is configured to cool said second stream of molten material on each side.

19. The extrusion head according to claim 11, wherein said thermal regulation device is configured to cool said first stream of molten material when said first stream of molten material is in said first annular passage prior to entering said joining portion.

20. The extrusion head according to claim 19, wherein said thermal regulation device comprises a cooling element located between said first and second annular passages.

* * * * *

UNITED STATES PATENT AND TRADEMARK OFFICE

CERTIFICATE OF CORRECTION

PATENT NO. : 7,008,577 B2 Page 1 of 1
APPLICATION NO. : 10/312038
DATED : March 7, 2006
INVENTOR(S) : Claude Dehennau et al.

It is certified that error appears in the above-identified patent and that said Letters Patent is hereby corrected as shown below:

Column 7, line 15, change "thennal" to -- thermal --.

Signed and Sealed this

Twelfth Day of September, 2006

JON W. DUDAS
*Director of the United States Patent and Trademark Office*